(12) United States Patent
Schröter et al.

(10) Patent No.: US 8,713,123 B2
(45) Date of Patent: Apr. 29, 2014

(54) METHOD OF SENDING CTI MESSAGES IN A COMMUNICATION SYSTEM

(75) Inventors: Otto Schröter, Essen (DE); Michael Volkmann, Herdecke (DE)

(73) Assignee: Siemens Enterprise Communications GmbH & Co KG., Munich (DE)

( * ) Notice: Subject to any disclaimer, the term of this patent is extended or adjusted under 35 U.S.C. 154(b) by 1640 days.

(21) Appl. No.: 11/630,187

(22) PCT Filed: Apr. 29, 2005

(86) PCT No.: PCT/EP2005/004643
§ 371 (c)(1),
(2), (4) Date: Dec. 19, 2007

(87) PCT Pub. No.: WO2006/002707
PCT Pub. Date: Jan. 12, 2006

(65) Prior Publication Data
US 2008/0205623 A1    Aug. 28, 2008

(30) Foreign Application Priority Data
Jun. 30, 2004   (GB) .................................. 0414566.0

(51) Int. Cl.
*G06F 15/16*   (2006.01)
(52) U.S. Cl.
USPC ........................................................ 709/207

(58) Field of Classification Search
USPC .................................................. 709/206–207
See application file for complete search history.

(56) References Cited

U.S. PATENT DOCUMENTS

| | | | |
|---|---|---|---|
| 6,252,855 B1 | 6/2001 | Langley | |
| 6,587,875 B1 | 7/2003 | Ogus | |
| 2001/0040887 A1 * | 11/2001 | Shtivelman et al. | 370/352 |
| 2002/0095474 A1 * | 7/2002 | Boys | 709/217 |

FOREIGN PATENT DOCUMENTS

| | | |
|---|---|---|
| EP | 0 969 647 A1 | 1/2000 |
| WO | WO 01/01621 A2 | 1/2001 |

* cited by examiner

*Primary Examiner* — Maceeh Anwari
(74) *Attorney, Agent, or Firm* — Buchanan Ingersoll & Rooney PC

(57) ABSTRACT

There is described a method of sending CTI messages in a communications system. The method comprises assigning to each of a plurality of CTI messages a priority indicator selected from a plurality of different priority indicators, sending the plurality of CTI messages from a queue formed by the CTI messages such that the time interval between two messages sent from the queue depends upon the priority indicator assigned to the first of the two messages to be sent, whereby the time interval between messages being sent from the queue may vary.

20 Claims, 3 Drawing Sheets

FIG 2

|   | OSI layers |
|---|---|
| 7 | Application |
| 6 | Presentation |
| 5 | Session |
| 4 | Transport |
| 3 | Network |
| 2 | Data link |
| 1 | Physical transmission |

FIG 3

Outputqueue

1. Invoke for Device 1 (Make call)
2. Invoke for Device 1 (Deflect call)
1. Invoke for Device 2 (Make call)
3. Invoke for Device 1 (Set Display)
4. Invoke for Device 1 (Answer call)
2. Invoke for Device 2 (Deflect call)
3. Invoke for Device 2 (Set Display)
4. Invoke for Device 2 (Answer call)

Inputqueue

Result for 1st Invoke for Device 1

Result for 2nd Invoke for Device 1

Result for 1st Invoke for Device 2

Result for 3rd Invoke for Device 1
Result for 4th Invoke for Device 1
Result for 2nd Invoke for Device 2
Result for 3rd Invoke for Device 2
Result for 4th Invoke for Device 2

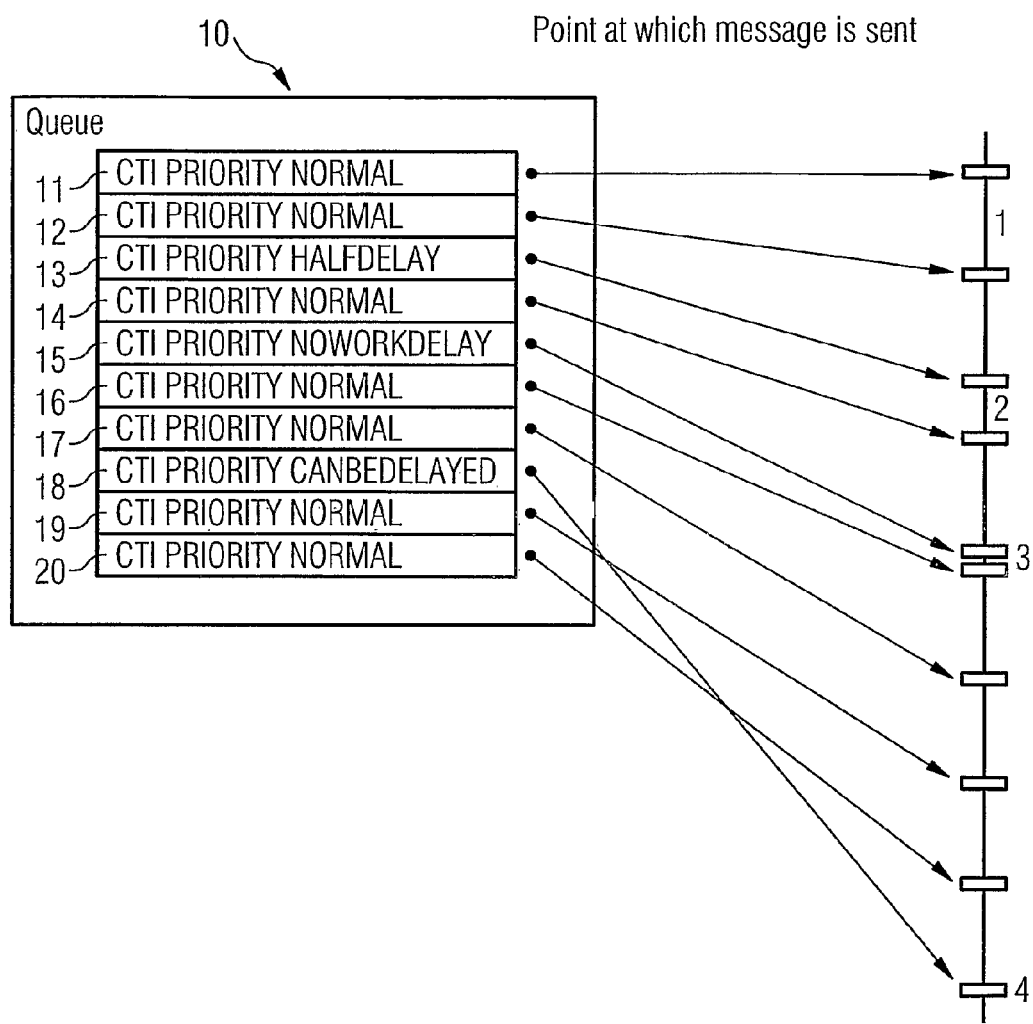

METHOD OF SENDING CTI MESSAGES IN A COMMUNICATION SYSTEM

CROSS REFERENCE TO RELATED APPLICATIONS

This application is the US National Stage of International Application No. PCT/EP2005/004643, filed Apr. 29, 2005 and claims the benefit thereof. The International Application claims the benefits of GB application No. 0414566.0 GB filed Jun. 30, 2004, both of the applications are incorporated by reference herein in their entirety.

FIELD OF INVENTION

The present invention relates to a method of sending CTI messages in a communications system.

BACKGROUND OF INVENTION

Computer Telephony Integration (CTI) is the concept of interfacing and coordinating telephony services with computer systems. This technology has been available since the mid-1980s, but it has not been widely used until recently. This can be attributed to the development of new technologies, such as general-purpose computers and the defining of International standards for interconnecting telephone and computer systems. The Computer-Supported Telephony Application (CSTA) call modeling and protocol standards developed by the European Computer Manufactures Association (ECMA) has emerged as the dominant standard accepted in the market, defining the method switches use to process all types of calls.

FIG. 1 schematically illustrates a CTI communication system 1 comprising a server 2 linked to a plurality of nodes e.g. Private Branch Exchanges (PBXs) 3. Each PBX 3 supports a number of devices 3a, which may for example be system telephones, plain old telephones (POTs), cordless phones, network trunks or the like. In such current CTI communication systems, CTI information is exchanged between servers and the communication nodes by means off CTI messages. These messages are normally encoded as defined in the CSTA Standard. Data is exchanged in such cases in both directions, whereby in some cases acknowledgements are sent for services, but in some cases they are transmitted unacknowledged. Messages from a server to a PBX are used for controlling devices and creating and controlling of calls. Messages from a PBX to a server are used to report device states and call states.

For a better understanding of CTI messages reference is made to the Open Systems Interconnection (ISO/OSI) 7-layer Reference Model illustrated in FIG. 2. CTI messages are layer 7 application messages. At a transmitting device, staring at the application layer, CTI messages are passed down from one layer to the next layer until transmitted in layer 1, the physical layer. At a receiving device, CTI messages are received in layer 1 and passed up from one layer to the layer above until the application layer is reached.

If a server is operating a number of Client applications simultaneously, the CSTA messages relevant to the individual applications may occur mixed over time in load situations. Typical CTI scenarios consist of one or more CSTA messages. For example, a CTI scenario may involve a sequence of 'Makecall', 'Deflectcall', 'SetDisplay' and 'Answercall'. If two applications execute the same scenario simultaneously, messages may become mixed. The assignment of the messages is however always unique because corresponding identifications (Ids) are used. All messages pass through a queue because information can sometimes be produced more quickly than it can be exchanged. An example of queue of outgoing messages and incoming messages respectively from and to a server running an application on a first device and an application on a second device is illustrated in FIG. 3.

As soon as high message loads occur, the messages build up in the queues, because on sending, a minimum time delay must be maintained between consecutive messages. This minimum sending delay is necessary to give the receiving device enough time to process the desired actions. An additional flow control of these messages is undertaken in the lower layers by normal LAN and TCP/IP protocols.

Congestion in the queues is basically the result of increases in the response times. This effect is a technical necessity but is always undesirable from a user's point of view.

The present invention aims to alleviate this problem.

SUMMARY OF INVENTION

According to the present invention there is provided a method of sending CTI messages in a communications system, the method comprising: assigning to each of a plurality of CTI messages a priority indicator selected from a plurality of different priority indicators, sending the plurality of CTI messages from a queue formed by the CTI messages such that the time interval between two messages sent from the queue depends upon the priority indicator assigned to the first of the two messages to be sent, whereby the time interval between messages being sent from the queue may vary.

BRIEF DESCRIPTION OF THE DRAWINGS

The above and further features of the invention are set forth with particularity in the appended claims and together with advantages thereof will become clearer from consideration of the following detailed description of an exemplary embodiment of the invention given with reference to the accompanying drawings, in which:

FIG. 2 illustrates the ISO/OSI 7-layer Reference Model;

FIG. 3 illustrates a queue of outgoing and incoming CTI messages; and have been described above, and furthermore;

DETAILED DESCRIPTION OF INVENTION

Figure 1:
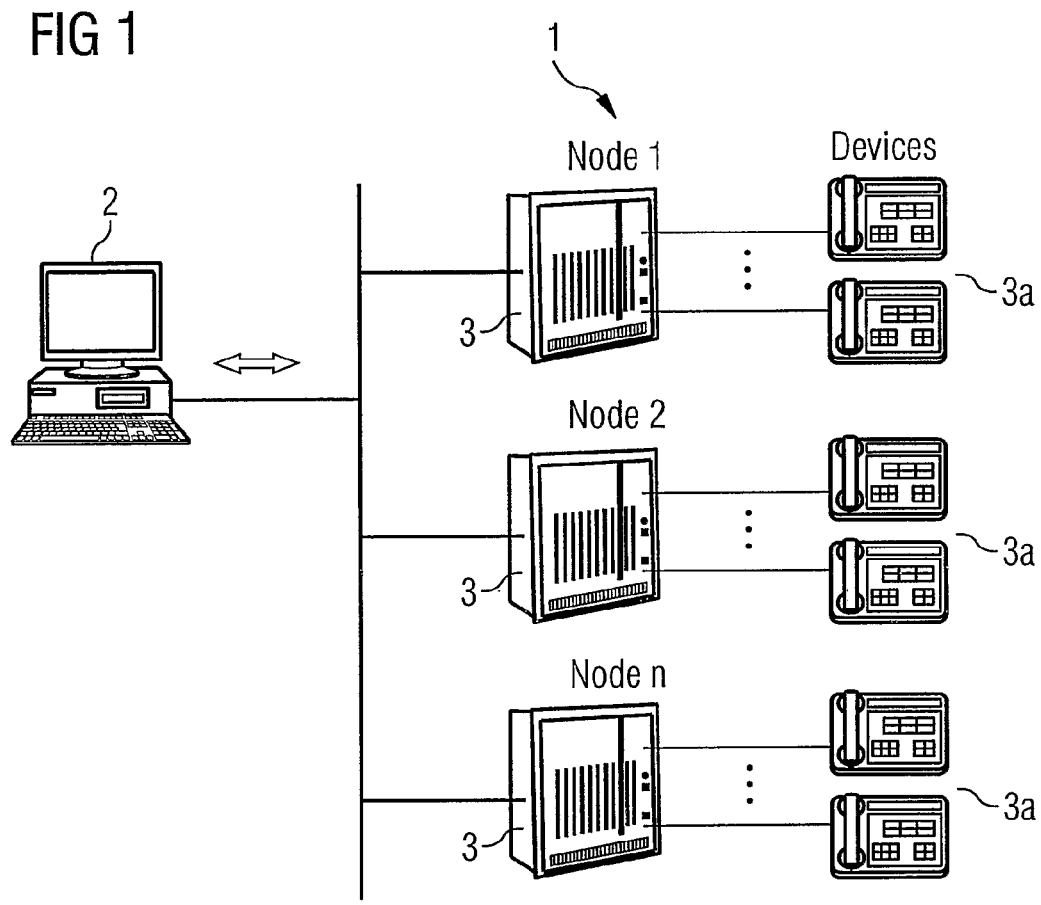
FIG. 1 illustrates a CTI communications system.

FIG. 4 illustrates schematically a queue of CTI messages, priorities assigned to the message, and a timing sequence for sending the messages.

CTI messages exchanged between servers and clients are not all of equal importance. For example, Call Control messages must be acted upon promptly and are thus considered as being very time-critical messages. In contrast statistics messages need not be acted upon quickly and thus may be thought of as being non-time-critical messages.

It is possible to distinguish between these messages on the basis of their logical content, but for the lower layers of the packet data transmission the content is transparent. This can and also should thus not be changed.

In embodiments of the present embodiment the timing of the forwarding of CTI messages is made dependent upon priorities assigned to the messages which indicate the time criticality of the messages.

Such a priority is assigned to a message when the message is transferred to the transport layer. This frees the transport layer from having to logical interpret the messages. It only has to implement defined measures for a given priority.

In a preferred embodiment the following message priorities are used:

CTI_PRIORITY_NORMAL

Messages which are given this priority cause a load situation in the distant end which requires that a subsequent message is not sent before a defined period of time has elapsed. This is the method which was previously used for all messages.

CTI_PRIORITY_HALFDELAY

These messages cause a load situation in the distant end such that a delay of half the delay time to the subsequent message is sufficient.

CTI_PRIORITY_NOWORKDELAY

This priority is assigned to messages which generate barely any delay at the distant end. Thus any follow-up messages can be sent directly after these messages without any delay.

CTI_PRIORITY_CANBEDELAYED

Messages assigned this priority are so non-time-critical that they can even be sent after messages generated later in time in favor of faster reaction times.

FIG. 4 schematically illustrates a queue 10 of CTI messages, for sending from a server to a particular PBX. For each PBX controlled by the server a separate queue would exist. Each message in the queue has been assigned a priority from the above list of priorities. The figure also illustrates the timing of the sending of the messages as determined by the priorities assigned to the messages.

The first message 11 in the queue has "Priority Normal" and so following the sending of this message, a normal or standard wait time $T_N$ is allowed to elapse before the second message 12 is sent. The second message 12 also has "Priority Normal" and so following the sending of this message, the normal wait time $T_N$ elapses before the third message 13 is sent. The third message 13 has "Priority Halfdelay" meaning that following the sending of this message, the time delay before sending the fourth message 14 need only be a half of the standard wait time $T_N$. The fifth message 15 has "Priority Noworkdelay" meaning that following the transmission of this message substantially no delay is applied before the sixth message 16 is sent. The sixth message 16 is another "Priority Normal" message and so following the sending of this message, the standard wait time $T_N$ is applied before the seventh message 17, also a "Priority Normal" message is sent.

The eighth message 18 has "Priority Canbe delayed" and so the sending of this message is delayed until after the sending of the ninth message 19 and subsequently the tenth message 20 both of which are "Priority Normal" messages. Thus, the ninth message 19 is sent after a delay of $T_N$ following the sending of the eighth message 18, the tenth message 20 is sent after a delay of $T_N$ following the sending of the ninth message 19 and finally, the delayed eighth message 18 is sent after a delay of $T_N$ following the sending of the tenth message 20.

Embodiments of the invention provide for an improved utilization of CTI links and a reduction in reaction times.

Having thus described the present invention by reference to a preferred embodiment it is to be well understood that the embodiment in question is exemplary only and that modifications and variations such as will occur to those possessed of appropriate knowledge and skills may be made without departure from the scope of the invention as set forth in the appended claims.

The invention claimed is:

1. A method for sending a plurality of Computer Telephony Integration (CTI) messages, the CTI messages comprising a first CTI message and a second CTI message, the method comprising:

a server assigning a priority indicator selected from a plurality of different priority indicators to each of the plurality of CTI messages, the priority indicator defining a predetermined time interval for sending each of the plurality of CTI messages relative to each other; and the server storing the plurality of CTI messages in a queue;

the server sending the first CTI message according to the priority indicator assigned to the first CTI message, the first CTI message being sent to one of a plurality of nodes to which the server is connected and the server sending the second CTI message to one of the plurality of nodes when the predetermined time interval defined by the priority indicator assigned to the first CTI message has passed; and wherein each of the nodes is communicatively connected to communication devices and supports the communication devices to which the node is connected.

2. The method of claim 1 wherein each of the communication devices is a telephone or cordless telephone and each of the nodes is a private branch exchange.

3. The method of claim 1 wherein the CTI messages also comprise a third CTI message and the CTI messages are stored in the queue such that the second CTI message is immediately after the first CTI message in the queue and the third CTI message is immediately after the second CTI message in the queue, and the method further comprising:

the server sending the third CTI message to one of the plurality of nodes when the predetermined time interval defined by the priority indicator assigned to the second CTI message has passed.

4. The method of claim 1 wherein the plurality of CTI messages comprise Computer Supported Telephony Application messages.

5. The method of claim 1 wherein each of the predetermined time intervals are selected from the group consisting of:

a standard time delay for a communication system, a portion of a standard time delay for a communication system, and a zero time delay such that an immediately successive CTI message is sent immediately following a time at which a previous CTI message was sent.

6. The method of claim 1 wherein the CTI messages are control messages.

7. The method of claim 1 wherein the CTI messages from the server to the nodes are used for controlling the communication devices and creating and controlling calls and wherein the nodes send messages to the server to report call states and device states to the server.

8. The method of claim 1 wherein the server, nodes and communication devices are part of a communication system and the priority indicator is assigned to each of the CTI messages when the CTI message is transferred to a transport layer in the communication system.

9. The method of claim 1 wherein each of the plurality of CTI messages has a time criticality and the predetermined time interval of the priority indicator is dependent upon the time criticality of each of the plurality of CTI messages.

10. The method of claim 1 wherein the method is performed during processing of a telephone call.

11. A communication system comprising:

a plurality of communication devices;

a plurality of network nodes, each of the nodes connected to at least one respective communication device of the communication devices to support that at least one communication device;

a network device storing a plurality of Computer Telephony Integration (CTI) messages in a queue and sending each of the plurality of CTI messages to a network node of the plurality of network nodes, each of the plurality of CTI messages having an assigned priority indicator defining a predetermined time interval between when the CTI message is sent and when another CTI message stored in the queue is sent, the plurality of CTI messages comprising a first CTI message and a second CTI message; and wherein the first CTI message is sent by the network device and the second CTI message is sent by the network device when the predetermined time interval defined by the priority indicator assigned to the first CTI message passes.

12. The CTI communication system of claim 11 wherein the network device comprises a server and each of the nodes is a private branch exchange and each of the communication devices is a telephone.

13. The communication system of claim 11 wherein the network device sends each of the plurality of CTI messages according to the assigned priority indicator of a previously sent CTI message.

14. The communication system of claim 13 wherein the predetermined time interval of the assigned priority indicator of the first CTI message is different from the predetermined time interval of the assigned priority indicator of the second CTI message.

15. The communication system of claim 11 wherein the plurality of CTI messages comprise Computer Supported Telephony Application messages.

16. The communication system of claim 11 wherein the predetermined time interval for each of the CTI messages is selected from the group consisting of: a standard time delay for a communication system, a portion of a standard time delay for a communication system, and a zero time delay such that a CTI message is sent immediately following a time at which a previous CTI message was sent.

17. The communication system of claim 11 wherein the CTI messages sent from the network device to the nodes are used for controlling the communication devices and creating and controlling calls and wherein the nodes send messages to the network device to report call states and device states to the network device.

18. The communication system of claim 11 wherein the predetermined time interval is dependent upon a time criticality of each of the plurality of CTI messages.

19. The communication system of claim 11 wherein the network device processes telephone calls.

20. The communication system of claim 19 wherein the plurality of CTI messages are control messages that control a telephone call.

* * * * *